US011206475B2

(12) United States Patent
Higgins et al.

(10) Patent No.: US 11,206,475 B2
(45) Date of Patent: Dec. 21, 2021

(54) WEARABLE ELECTRONIC DEVICE AND STRAP ARRANGEMENT WITH CHARGING PORTS FOR CHARGING EAR-WORN ELECTRONIC DEVICES

(71) Applicant: Starkey Laboratories, Inc., Eden Prairie, MN (US)

(72) Inventors: Sidney A. Higgins, Maple Grove, MN (US); Achintya Kumar Bhowmik, Cupertino, CA (US); David Willey, Maple Grove, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 168 days.

(21) Appl. No.: 16/702,988

(22) Filed: Dec. 4, 2019

(65) Prior Publication Data
US 2020/0186908 A1    Jun. 11, 2020

Related U.S. Application Data

(60) Provisional application No. 62/776,678, filed on Dec. 7, 2018.

(51) Int. Cl.
*H02J 7/00* (2006.01)
*H04R 1/10* (2006.01)
(Continued)

(52) U.S. Cl.
CPC .......... *H04R 1/1025* (2013.01); *G06F 1/163* (2013.01); *G06F 1/266* (2013.01); *H02J 7/0044* (2013.01);
(Continued)

(58) Field of Classification Search
CPC ....... H04R 1/1025; G06F 1/266; G06F 1/163; H02J 7/0045; H02J 7/0044; H02J 7/342;
(Continued)

(56) References Cited

U.S. PATENT DOCUMENTS 6,874,931 B2    4/2005  Noirjean et al.
9,395,696 B2    7/2016  Pegg
(Continued)

FOREIGN PATENT DOCUMENTS

EP        1721237        11/2006
WO        2017/205575    11/2017

*Primary Examiner* — Zixuan Zhou
(74) *Attorney, Agent, or Firm* — Mueting Raasch Group

(57) ABSTRACT

A wearable apparatus includes a wearable electronic device comprising a rechargeable power source, charging circuitry, a processor, and a display. A strap arrangement is connected to the wearable electronic device and comprises one or more charge ports. Each charge port is electrically coupled to the wearable electronic device and comprises a volume of resilient material comprising a through-hole dimensioned to receive one of the electronic devices. The volume of resilient material is configured to stretch and generate a retentive force sufficient to retain the electronic device within the through-hole. Electrical contacts are disposed on a wall of the volume of resilient material and recessed within a thickness of the volume of resilient material. The electrical contacts are configured to electrically communicate with corresponding electrical contacts of the electronic device. The charging circuitry of the wearable electronic device is configured to charge rechargeable power sources of the electronic devices.

24 Claims, 9 Drawing Sheets

(51) Int. Cl.
*G06F 1/16* (2006.01)
*G06F 1/26* (2006.01)
*H02J 7/34* (2006.01)

(52) U.S. Cl.
CPC ........... *H02J 7/0045* (2013.01); *H02J 7/0047* (2013.01); *H02J 7/0048* (2020.01); *H02J 7/342* (2020.01)

(58) Field of Classification Search
CPC .... H02J 7/0048; H02J 7/0068; H02J 7/00712; H02J 7/0047
USPC .......... 320/103, 113, 137; 439/37, 420, 464, 439/471, 527, 528, 799
See application file for complete search history.

(56) References Cited

U.S. PATENT DOCUMENTS

| | | | |
|---|---|---|---|
| 9,553,475 B2 | 1/2017 | Boysen, III et al. | |
| 9,904,254 B1 | 2/2018 | Hariri | |
| 2007/0279852 A1* | 12/2007 | Daniel | G06F 1/163 361/679.03 |
| 2014/0334083 A1* | 11/2014 | Bailey | G06F 1/1656 361/679.03 |
| 2015/0234426 A1* | 8/2015 | Bailey | G06F 1/163 361/679.03 |
| 2015/0311569 A1 | 10/2015 | Yu et al. | |
| 2015/0333302 A1 | 11/2015 | Johns et al. | |
| 2016/0056650 A1 | 2/2016 | Hall | |
| 2016/0062319 A1 | 3/2016 | Kim et al. | |
| 2017/0000222 A1* | 1/2017 | Lee | G04G 17/06 |

\* cited by examiner

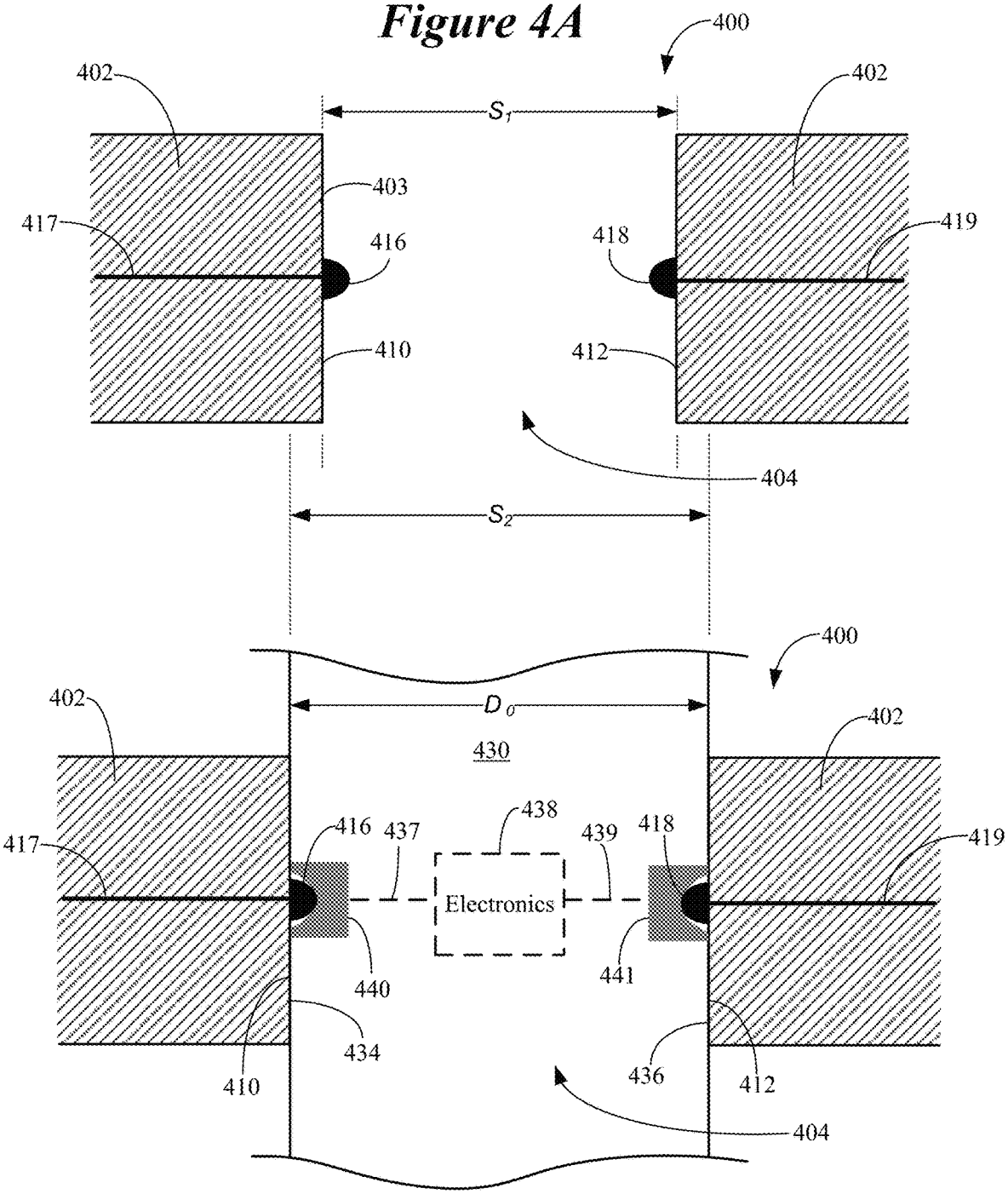

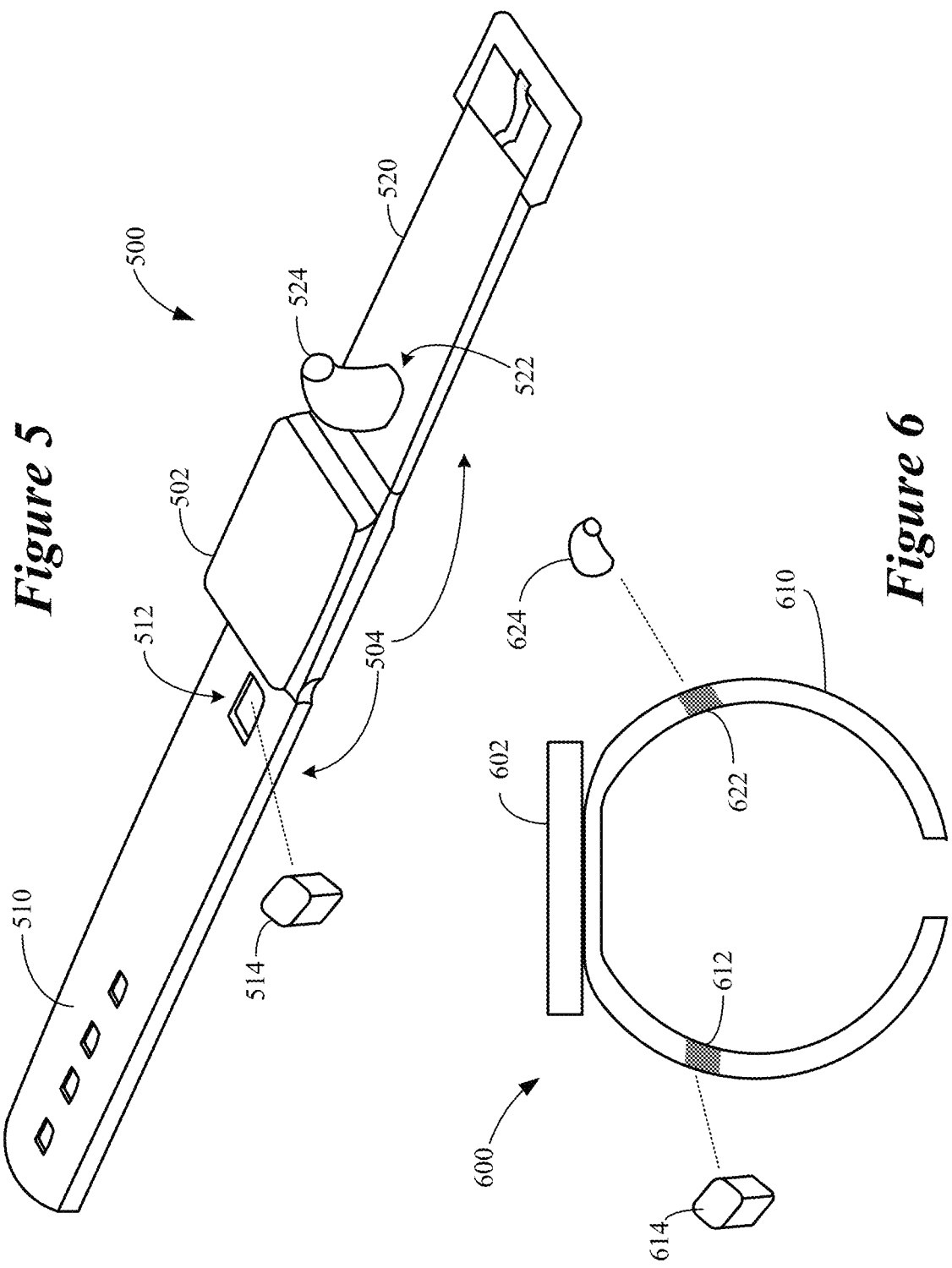

WEARABLE ELECTRONIC DEVICE AND STRAP ARRANGEMENT WITH CHARGING PORTS FOR CHARGING EAR-WORN ELECTRONIC DEVICES

RELATED PATENT DOCUMENTS

This application claims the benefit of Provisional Patent Application Ser. No. 62/776,678 filed on Dec. 7, 2018, to which priority is claimed pursuant to 35 U.S.C. § 119(e), and which is incorporated herein by reference in its entirety.

TECHNICAL FIELD

This application relates generally to wearable electronic devices with a strap arrangement comprising charging ports for charging electronic devices, including hearables, sensors, microphones, and other wearable devices.

BACKGROUND

Wearable electronic devices provide for enhanced portability. However, wearable electronic devices require a source of power, which can become depleted during use. For example, hearing devices, such as hearing aids and other hearables, often include a rechargeable battery that can be recharged, but can become depleted during daily use, leaving the user without the benefit of a functioning hearing device.

SUMMARY

Embodiments are directed to a wearable apparatus configured to charge at least a pair of ear-worn electronic devices. The apparatus includes a wearable electronic device comprising a rechargeable power source, charging circuitry, a processor, and a display. A strap arrangement is connected to the wearable electronic device and comprises at least two charge ports. Each of the charge ports is electrically coupled to the wearable electronic device and comprises a volume of resilient material comprising a through-hole dimensioned to receive one of the ear-worn electronic devices. The volume of resilient material is configured to stretch and generate a retentive force sufficient to retain the ear-worn electronic device within the through-hole. Electrical contacts are disposed on a wall of the volume of resilient material defining the through-hole and recessed within a thickness of the volume of resilient material. The electrical contacts are configured to electrically communicate with corresponding electrical contacts of the ear-worn electronic device. The charging circuitry of the wearable electronic device is configured to charge rechargeable power sources of the ear-worn electronic devices.

Embodiments are directed to a method of charging at least a pair of ear-worn electronic devices. The method comprises receiving the pair of ear-worn electronic devices by two charge ports defined by through-holes provided in a strap arrangement connected to a wearable electronic device. The method comprises generating, by a volume of resilient material of the strap arrangement surrounding each of the through-holes, a retentive force sufficient to retain the ear-worn electronic devices within the two charge ports. The method also comprises establishing electrical communication between electrical contacts of the two charge ports recessed within a thickness of the volume of resilient material, electrical contacts of the ear-worn electronic devices, and charging circuitry of the wearable electronic device. The method further comprises charging rechargeable power sources of the ear-worn electronic devices using the charging circuitry of the wearable electronic device.

Embodiments are directed to a wearable apparatus configured to charge one or more electronic devices. The apparatus includes a wearable electronic device comprising a rechargeable power source, charging circuitry, a processor, and a display. A strap arrangement is connected to the wearable electronic device and comprises one or more charge ports. Each of the charge ports is electrically coupled to the wearable electronic device and comprises a volume of resilient material comprising a through-hole dimensioned to receive one of the electronic devices. The volume of resilient material is configured to stretch and generate a retentive force sufficient to retain the electronic device within the through-hole. Electrical contacts are disposed on a wall of the volume of resilient material defining the through-hole and recessed within a thickness of the volume of resilient material. The electrical contacts are configured to electrically communicate with corresponding electrical contacts of the electronic device. The charging circuitry of the wearable electronic device is configured to charge a rechargeable power source of the one or more electronic devices. The one or more electronic devices can include a physiologic sensor pod comprising at least one physiologic sensor, a rechargeable power source, and electrical contacts configured to mechanically engage the electrical contacts of a charge port. The one or more electronic devices can include a motion sensor pod comprising at least one motion sensor, a rechargeable power source, and electrical contacts configured to mechanically engage the electrical contacts of a charge port. Other representative rechargeable electronic devices include a remote microphone, a geo-location sensor, a communication device, a control device, and a direct audio input device.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIGS. 4A and 4B are cross-sectional views of a charge port comprising a volume of resilient material prior to and after receiving a DUC in accordance with various embodiments;

FIG. 5 illustrates a wearable apparatus configured to charge at least two DUCs in accordance with various embodiments;

FIG. 6 illustrates a wearable apparatus configured to charge at least two DUCs in accordance with various embodiments;

The figures are not necessarily to scale. Like numbers used in the figures refer to like components. However, it will be understood that the use of a number to refer to a component in a given figure is not intended to limit the component in another figure labeled with the same number;

DETAILED DESCRIPTION

Figure 1:
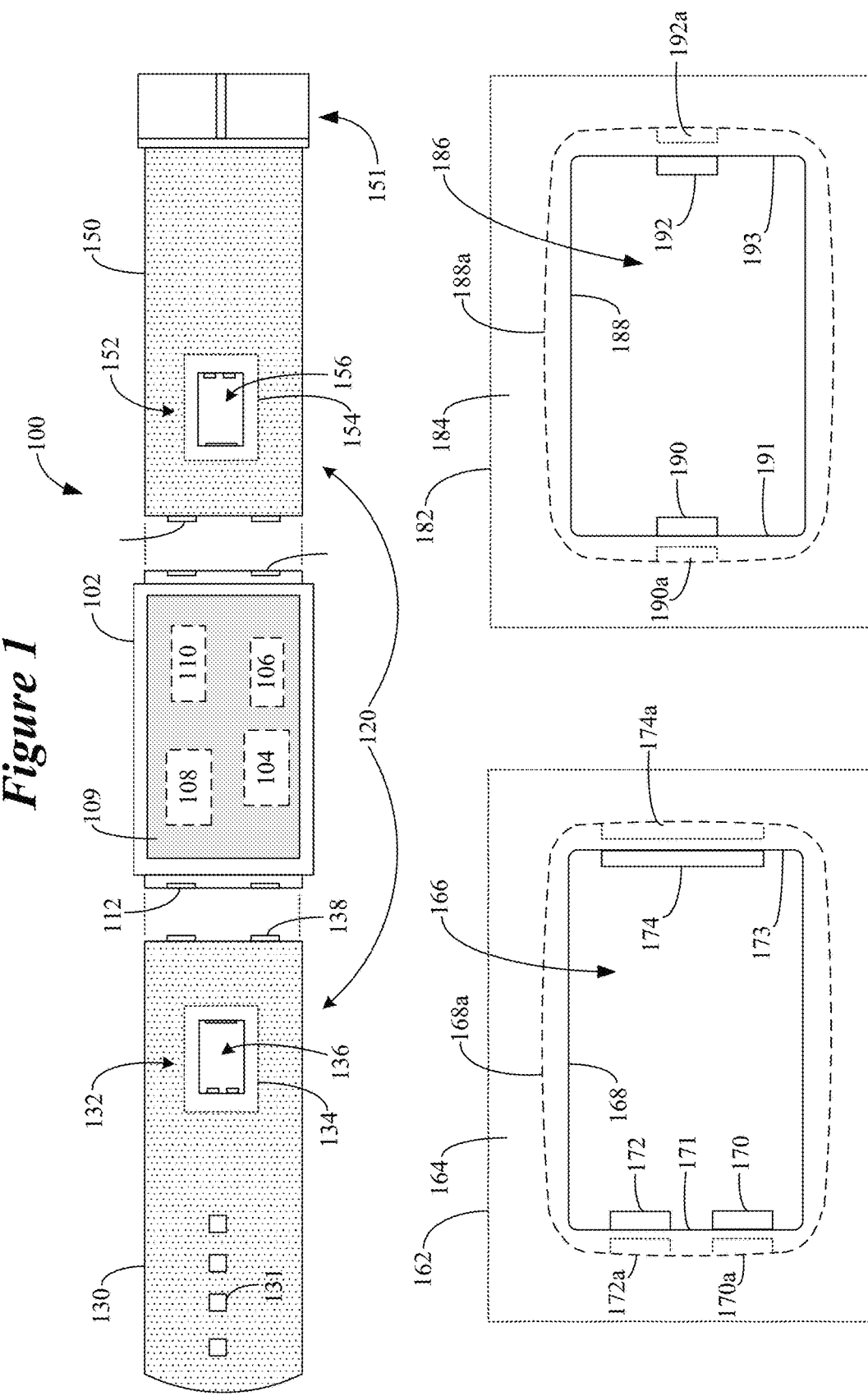
FIG. 1 illustrates a wearable apparatus configured to charge one or more devices under charge (DUCs) in accordance with various embodiments.

Wearable electronic devices take many forms, and each requires a power source, such as a rechargeable battery. A conventional approach to charging the power source of a wearable electronic device involves the use of a charging station designed to be placed on a table and plugged into a wall socket within a wearer's home. Conventional charging approaches fail to address a significant problem faced by on-the-go wearers of wearable electronic devices. During normal use of wearable electronic devices away from the wearer's home (and charging station), the wearer may experience a "dead battery" scenario, which renders the wearable electronic devices temporarily inoperable. Although some on-the-go chargers have been developed, such chargers constitute yet another appliance that must be carried by the wearer. Also, the transport and storage for these accessories-for-accessories during travel is cumbersome and often a crucial component as left behind. Further, in most cases, the charging station outlasts the life of the wearable device under charge, and must be replaced along with the wearable device.

Embodiments of the disclosure are directed to a wearable apparatus comprising a wearable electronic device connected to a strap arrangement configured to receive and charge at least one device under charge (DUC). Representative embodiments of the disclosure are directed to a wearable apparatus comprising a wearable electronic device connected to a strap arrangement which includes a plurality of charge ports configured to receive and charge a plurality of DUCs. A DUC can represent any device that includes a rechargeable power source, several non-limiting examples of which are disclosed herein.

According to some embodiments, the strap arrangement of a wearable apparatus includes at least a pair of charge ports configured to receive and charge a pair of ear-worn electronic devices. In other embodiments, the strap arrangement of a wearable apparatus includes one or more charge ports configured to receive and charge one or a combination of physiologic sensors, motion sensors, microphones, control devices, and/or communication devices. In further embodiments, the strap arrangement of a wearable apparatus includes a pair of charge ports configured to receive and charge a pair of rechargeable ear-worn electronic devices and, in addition, one or more charge ports configured to receive and charge one or a combination of physiologic sensors, motion sensors, microphones, control devices, and/ or communication devices. In some embodiments, the strap arrangement is designed to be detachable from the wearable electronic device. In other embodiments, the strap arrangement is designed to be permanently affixed to the wearable electronic device.

According to some embodiments, the wearable electronic device to which the strap arrangement is connected includes a rechargeable power source which, when being charged by an external power source, also charges one or more DUCs received by charging ports in the strap arrangement. According to other embodiments, when unconnected to an external power source, the rechargeable power source of the wearable electronic device serves as a power source for recharging one or more DUCs received by charging ports in the strap arrangement.

In accordance with some embodiments, the charge ports and associated charging circuitry of a wearable electronic apparatus are configured to charge one or more DUCs using a conventional charging methodology. A conventional charging methodology involves charging power sources of the one or more DUCs at a normal charge rate at or below 1.0 C, with typical charge times ranging between 2 and 6 hours (e.g., 3.5 hours) to fully charge the DUCs. In accordance with other embodiments, the charge ports and associated charging circuitry of a wearable electronic apparatus are configured to charge one or more DUCs using an "accelerated charging" methodology. The term "accelerated charging" refers to charging a rechargeable power source (e.g., a battery) at an accelerated charge rate above 1.0 C when the power source has a sufficiently low voltage or state of charge (SoC).

Accelerated charging can be implemented to partially charge a rechargeable power source of a DUC within a relatively short time frame, such that the power source has a storage capacity for several hours of use. For example, after about 5 minutes of accelerated charging, a DUC (e.g., an ear-worn electronic device) can have sufficient charge for between 2 and 6 hours (e.g., 3 hours) of use. Accelerated charging of a rechargeable power source can be implemented when the SoC of the power source is within a predetermined SoC range, such as between 5 and 45%. Because the power source is at a low voltage or low SoC, the rate at which it can be charged can be increased beyond 1.0 C without the risk of damaging the power source. For example, lithium plating can occur when charging a lithium-ion battery at charge rates above 1.0 C, particularly when the battery is almost fully charged. However, charging a lithium-ion battery at an accelerated charge rate above 1.0 C (e.g., from 1.5 C to 3.0 C) when the SoC is within 5 to 45% significantly decreases the risk of cell degradation due to lithium plating.

As was previously discussed, a DUC can represent any device that includes a rechargeable power source. Representative DUCs include ear-worn electronic devices, physiologic sensors, motion sensors, microphones, control devices, and/or communication devices, among others. Various ear-worn electronic devices are contemplated, including hearables (e.g., ear monitors, earbuds) and hearing assistance devices (e.g., hearing aids). Hearing assistance devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above.

Various physiologic sensors (also referred to herein as physiologic sensor pods) are contemplated, including sensors configured to sense electrocardiograms (ECG), electromyograms (EMG), heart rate (HR), body temperature, electrodermal activity (EDA) or galvanic skin response (GSR), blood glucose, arterial oxygen saturation (SpO2), blood pressure (BP), and respiration rate (RR). Various motion sensors (also referred to herein as motion sensor pods) are contemplated, including accelerometers, gyros, inertial measurement units (e.g., a 9-axis IMU), and magnetometers, which may be implemented as micro-electro-mechanical system (MEMS) based motion sensors. Monitoring of physiological signals of the wearer can help to detect and diagnose various cardiovascular, neurological, and pulmonary diseases at their early onset. Also, monitoring of a wearer's motion activities can be useful in fall detection, gait pattern and posture analysis, and in sleep assessment.

Other representative DUCs include remote microphones, geo-location sensors (e.g., GPS sensors), and communication devices (e.g., Bluetooth®-enabled devices or pods), such as a transceiver, transponder, repeater, bridge, or an adapter. A DUC can be a control device that includes one or more controls (e.g., buttons) that expand the control capability of another device, such as an ear-worn electronic device or devices. For example, a DUC can be configured to wirelessly communicate a control signal to an ear-worn electronic device(s) in response to wearer actuation of a DUC control or button. The control signal can effect a change in the operation of the ear-worn electronic device(s) and/or implement a device function (e.g., mute, volume increase/decrease, microphone directionality, audio stream selection). A DUC can be configured as a direct audio input (DIA) device that receives an audio stream from an external source. The DIA DUC can be configured to communicate a received audio stream to the wearable electronic device which, in turn, communicates the audio stream to the ear-worn electronic device(s), wirelessly or via a wired connection.

FIG. 1 illustrates a wearable apparatus configured to charge one or more DUCs in accordance with various embodiments. The wearable apparatus 100 shown in FIG. 1 includes a wearable electronic device 102 and a strap arrangement 120. The wearable electronic device 102 includes a rechargeable power source 104, charging circuitry 106, a processor or controller 108, and a display 109. The wearable electronic device 102 can also include a wireless transceiver 110 (e.g., a radio operable in the 2.4 GHz ISM frequency band). The wireless transceiver 110 can conform to an IEEE 802.11 (e.g., WiFi®) or Bluetooth® (e.g., BLE, Bluetooth® 4.2 or 5.0) specification, for example. The wearable electronic device 102 is representative of a variety of different devices, including a watch, a health monitor, a fitness monitor, or a combination of these devices.

The strap arrangement 120 is configured to physically and electrically connect to the wearable electronic device 102. In the embodiment shown in FIG. 1, the strap arrangement 120 includes a first strap 130 and a second strap 150. In some embodiments, the strap arrangement 120 is configured to detach and reattach to the wearable electronic device 102. In other embodiments, the strap arrangement 120 is configured to be permanently attached to the wearable electronic device 102 (e.g., not designed for detachment and reattachment). The first and second straps 130, 150 can comprise elastic material, inelastic material, or a combination of elastic and inelastic material. The strap arrangement 120 includes a fastening arrangement 131, 151 (e.g., a buckle and through-hole arrangement, a hook and loop arrangement, a magnetic clasp arrangement) that facilitates attachment and detachment of the wearable apparatus 100 to and from a body part (e.g., a wrist or ankle) of the wearer.

The strap arrangement 120 includes at least two charge ports 132, 152 each configured to receive and charge a DUC. Each of the charge ports 132, 152 is electrically coupled to the wearable electronic device 102 via electrical contacts. In the embodiment shown in FIG. 1, charge port 132 is electrically coupled to electrical contacts 138 on the first strap 130 (via conductors disposed within the first strap 130), which electrically communicate with electrical contacts 112 of the wearable electronic device 102. Charge port 152 is electrically coupled to electrical contacts 158 on the second strap 150 (via conductors disposed within the second strap 150), which electrically communicate with electrical contacts 114 of the wearable electronic device 102. The electrical contacts of the wearable electronic device 102 and the strap arrangement 120 facilitate delivery of power from the wearable electronic device 102 to the charge ports 132, 152. These electrical contacts can also provide for the communication of data and/or control signals between the wearable electronic device 102 and the charge ports 132, 152. The electrical contacts 112, 114, 138, 158 can comprise spring arm contacts, conductive elastomers, spring plunger contacts, pin and socket connections, or a combination of these contact arrangements.

Each of the charge ports 132, 152 comprises a volume of resilient material 134, 154 comprising a through-hole 136, 156 dimensioned to receive a DUC. The volume of resilient material 134, 154 can be an insert or an integral component of the first and second straps 130, 150. The resilient material 134, 154 can be an elastomeric material, such as an injection-moldable thermoplastic elastomer (TPE). The resilient material 134, 154 can also be natural rubber, silicone, or other biocompatible elastomer that does not take a set. The volume of resilient material 134, 154 is configured to stretch and generate a retentive force sufficient to retain the DUCs within the through-holes 136, 156 of the charge ports 132, 152. The retentive force generated by the volume of resilient material 134, 154 retains the DUCs within the charge ports 132, 152 without need for, or assistance from, other retention mechanisms, such as mechanisms disposed on an exterior surface of the first and second straps 130, 150.

Figure 2:
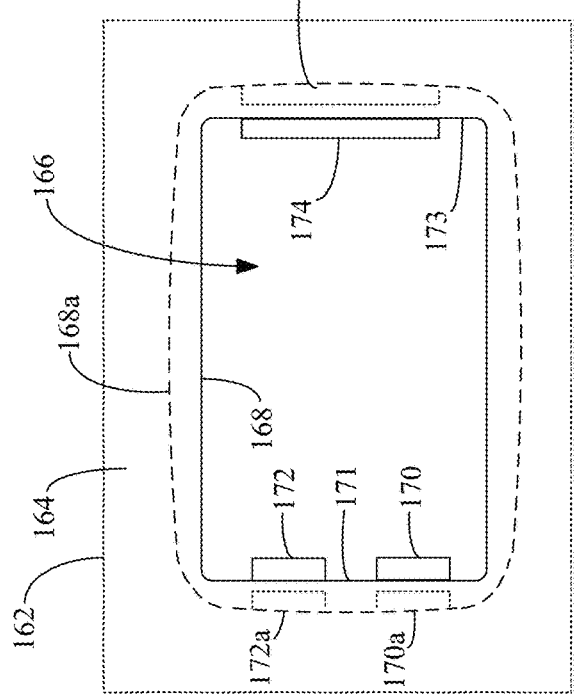
FIG. 2 shows a charge port of a strap arrangement connected to a wearable electronic device in accordance with various embodiments.

FIG. 2 shows a charge port of a strap arrangement connected to a wearable electronic device in accordance with various embodiments. The charge port 162 shown in FIG. 2 includes a volume of resilient material 164, which is surrounded by the bulk material of the strap arrangement (not shown, but see FIG. 1). As was previously mentioned, the bulk material of the strap arrangement can comprise elastic material, inelastic material, or a combination of elastic and inelastic material. The volume of resilient material 164 comprises a through-hole 166 dimensioned to receive a DUC. The through-hole 166 includes a wall 168 having a first side 171 and an opposing second side 173. Electrical contacts 170, 172 are disposed on the first side 171 of the wall 168. Electrical contacts 170, 172 are recessed within a thickness of the volume of resilient material 164 relative to an external surface of the strap arrangement. Recessing electrical contacts 170, 172 into the thickness of the strap arrangement prevents snagging and other potentially damaging contact with clothing, body parts, and other external objects.

When a DUC is properly positioned within the through-hole 166, electrical contacts 170, 172 of the charge port 162 mechanically engage corresponding electrical contacts of the DUC. Electrical contacts 170, 172 can be configured to generate tactile feedback in response to mechanical engagement with the corresponding electrical contacts of the DUC. This tactical feedback provides confirmation to the wearer that the DUC is properly positioned within the charge port 162. In some embodiments, a retention pin 174 is disposed on the second side 173 of the wall 168 of the through-hole 166 and recessed within the thickness of the volume of resilient material 164. Retention pin 174 is configured to mechanically engage a corresponding retention feature of the DUC when the DUC is inserted into the through-hole 166. When properly positioned within the through-hole 166, contact between retention pin 174 and a corresponding retention feature of the DUC generates tactile feedback confirming that the user has properly positioned the DUC within the charge port 162.

Figure 3:
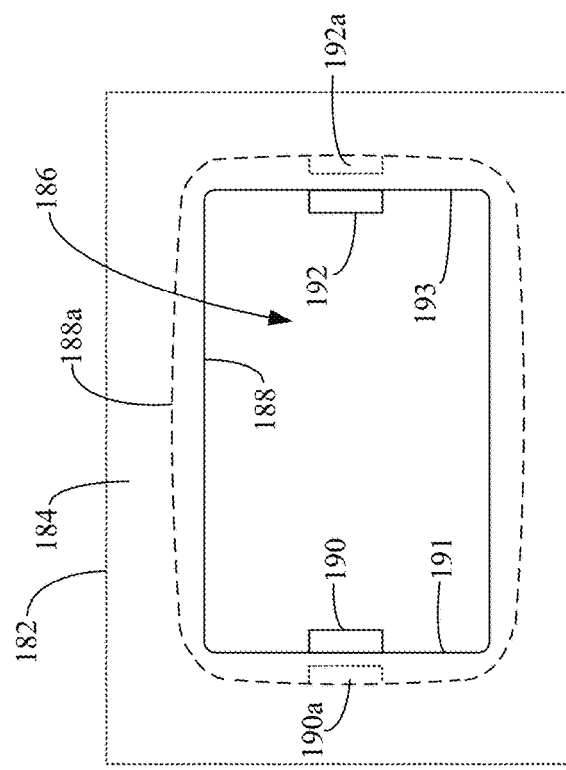
FIG. 3 shows a charge port of a strap arrangement connected to a wearable electronic device in accordance with various embodiments.

FIG. 3 shows a charge port of a strap arrangement connected to a wearable electronic device in accordance with various embodiments. The charge port 182 shown in FIG. 3 includes a volume of resilient material 184, which is surrounded by the bulk material of the strap arrangement. The volume of resilient material 184 comprises a through-hole 186 dimensioned to receive a DUC. The through-hole 186 includes a wall 188 having a first side 191 and an opposing second side 193. Electrical contact 190 is disposed on the first side 191 of the wall 188. Electrical contact 192 is disposed on the second side 193 of the wall 188. Electrical contacts 190, 192 are recessed within a thickness of the volume of resilient material 184 relative to an external surface of the strap arrangement. When a DUC is properly positioned within the through-hole 186, electrical contacts 190, 192 of the charge port 182 mechanically engage corresponding electrical contacts of the DUC and preferably provide tactical feedback to the user indicating that the DUC has been properly seated within the charge port 182.

As is shown in FIGS. 2 and 3, the volume of resilient material 164, 184 is configured to stretch (e.g., compress, deform, distend) when a DUC is forcibly inserted into the through-hole 166, 186 of the charge port 162, 182. For example, the wall of the through-hole 166, 186 has an initial size and shape prior to receiving a DUC, as indicated by the solid line showing the initial state of wall 168, 188 in FIGS. 2 and 3. As a DUC is forcibly inserted into the through-hole 166, 186, the wall of the through-hole 166, 186 is displaced relative to its initial size and shape, as indicated by the dashed line showing the final state of wall 168a, 188a. Displacement of the wall 168, 188 from its initial state to its final state (168a, 188a) places the volume of resilient material 164, 184 into compression. When placed into compression, the volume of resilient material 164, 184 generates a retentive force that acts on the surface of the DUC in contact with the wall 168, 188. This retentive force is sufficient to securely retain the DUC within the through-hole 166, 186. It is noted that, in some embodiments, a charge port 162, 182 can include one or more additional electrical contacts, such as one or more electrical contacts dedicated to communicating data and/or control signals to one or more corresponding electrical contacts of a DUC positioned within the charge port 162, 182.

FIGS. 4A and 4B are cross-sectional views of a charge port comprising a volume of resilient material prior to and after receiving a DUC in accordance with various embodiments. FIG. 4A shows a charge port 400 prior to receiving a DUC 430. FIG. 4B shows the charge port 400 after receiving the DUC 430. The charge port 400 comprises a volume of resilient material 402 comprising a through-hole 404 dimensioned to receive the DUC 430. The through-hole 404 includes a wall 403 having a first side 410 and an opposing second side 412. Electrical contact 416 is disposed on the first side 410. Electrical contact 418 is disposed on the second side 412. In some embodiments, electrical contacts 416, 418 are disposed on the same side (e.g., first or second side 410, 412) of the wall 403, such as shown in the embodiment of FIG. 2. Although not shown in FIGS. 4A and 4B, one or more retention pins can be disposed on the wall 403 of the charge port 400. Prior to insertion of the DUC 430 into the through-hole 404, the charge port 400 has a spacing $S_1$ between the first and second sides 410, 412.

Electrical contacts 416, 418 are connected to respective conductors 417, 419 (e.g., a wire or trace) which are embedded within the thickness of the resilient material 402. The conductors 417, 419 are routed through the thickness of the resilient material 402 to electrical contacts of the strap arrangement that communicate with electrical contacts of the wearable electronic device (see, e.g., FIG. 1). Embedding conductors 417, 419 within the thickness of the resilient material 402 (rather than on the external surface of the strap arrangement) prevents snagging of, and damage to, the conductors 417, 419.

It is understood that the spacing $S_1$ (and spacing $S_2$) can represent a width, a length, a diameter, or other dimension of the charge port 400, and that these other dimensions behave similarly in response to receiving and removing the DUC 430 by/from the through-hole 404. It is also understood that the through-hole 404 can have any shape that corresponds to a shape of the DUC 430. For example, the through-hole 404 can have the shape of an N-sided polygon, where $N >= 3$. The through-hole 404 can have a regular or irregular polygonal shape, such as the shape of a regular or irregular square, rectangle, triangle, quadrilateral, trapezoid, rhombus, parallelogram, kite, pentagon, hexagon, heptagon, octagon, nonagon, decagon or dodecagon, or a combination of any of these shapes. The through-hole 404 can have a curved or curvilinear shape, such as a circle, oval, ellipse, crescent, quatrefoil, curvilinear polygon, an arbitrary closed curve, or a combination of any of these shapes. The through-hole 404 can have a combination of polygonal and curvilinear shapes.

FIG. 4B shows the charge port 400 after insertion of the DUC 430 into the through-hole 404. The DUC 430 includes an external surface 432 having a first side 434 and an opposing second side 436. The DUC 430 includes a first electrical contact 440 disposed on the first side 434 and a second electrical contact 441 disposed on the second side 436 of the exterior surface 432. The first and second electrical contacts 440, 441 are coupled to electronics 438 contained within the housing of the DUC 430 via conductors 437, 439. The DUC 430 is shown to have a dimension $D_0$, which can represent a length, width, diameter or other dimension of the DUC 430.

The spacing S1 between the first and second sides 410, 412 of the through-hole wall 403 shown in FIG. 4A is designed to be slightly smaller than the dimension $D_0$ of DUC 430. Because the dimension $D_0$ of DUC 430 is greater than the spacing S1 of the through-hole 404, the volume of resilient material 402 stretches to accommodate the dimension $D_0$ as the DUC 430 is forcibly inserted into the through-hole 404. As is shown in FIG. 4B, the spacing between the first and second sides 410, 412 is increased from $S_1$ to $S_2$ due to the presence of the DUC 430 within the through-hole 404. The magnitude of stretching by the volume of resilient material 402 to accommodate the DUC 430 is largely dependent on size of the external surface 432 of the DUC 430 relative to the size of the through-hole 404. In general, the change in size of the through-hole 404 prior to and after insertion of the DUC 430 can range from about 2% to about 30% (e.g., from about 5-20% or about 10-15%).

As the DUC 430 is forcibly inserted into the through-hole 404, the electrical contacts 416, 418 of the charge port 400 are displaced laterally in response to compression of the volume of resilient material 402. When electrical contacts 440, 441 of the DUC 430 come into proximity with electrical contacts 416, 418 of the charge port 400, the compression built up in the volume of resilient material 402 forces electrical contacts 416, 418 laterally into mechanical engagement with electrical contacts 440, 441 of the DUC 430. The forcible contact between electrical contacts 416, 418 of the charge port 400 and electrical contacts 440, 441 of the DUC 430 generates tactile feedback (e.g., a click) indicating to the user that the DUC 430 is properly seated within the charge port 400. The DUC 430 is securely retained within the charge port 400, such as during charging of the DUC 430 and manipulation/transport of the wearable apparatus. Removal of the DUC 430 from the charge port 400 involves the user pulling on the DUC 430 with sufficient force to overcome the retentive force generated by compression of the volume of resilient material 402.

FIG. 5 illustrates a wearable apparatus configured to charge at least two DUCs in accordance with various embodiments. The wearable apparatus 500 shown in FIG. 5 includes a wearable electronic device 502 and a strap arrangement 504 connected to the wearable electronic device 502. The wearable electronic device 502 can be a watch, health monitor, or fitness monitor, for example. The strap arrangement 504 includes a first strap 510 and a second strap 520. The first strap 510 includes a first charge port 512 configured to receive and electrically communicate with a first DUC 514. In the embodiment shown in FIG. 5, the first DUC 514 is representative of a remote microphone pod, a physiologic sensor pod, a motion sensor pod, a control pod or a communication pod, for example. The second strap 520 includes a second charge port 522 configured to receive and electrically communicate with a second DUC 524. As shown, the second DUC 524 is representative of an ear-worn electronic device, such as a hearing aid (e.g., a BTE, RIC or RITE hearing aid). It is understood that the wearable apparatus 500, when configured to charge ear-worn electronic devices, will typically include at least two charge ports for charging left and right ear-worn electronic devices.

FIG. 6 illustrates a wearable apparatus configured to charge at least two DUCs in accordance with various embodiments. The wearable apparatus 600 shown in FIG. 6 includes a wearable electronic device 602 and a strap arrangement 610 connected to the wearable electronic device 602. The strap arrangement 610 is a bracelet-style arrangement, which can be implemented as a single-element bracelet or a multiple-element bracelet. The bracelet 610 includes a first charge port 612 configured to receive and electrically communicate with a first DUC 614, and a second charge port 622 configured to receive and electrically communicate with a second DUC 624. In the embodiment shown in FIG. 6, the first DUC 614 is representative of a remote microphone pod, a physiologic sensor pod, a motion sensor pod, a control pod or a communication pod, for example. As shown, the second DUC 624 is representative of an ear-worn electronic device, such as a hearing aid (e.g., a BTE, RIC or RITE hearing aid). It is understood that the wearable apparatus 600 when configured to charge ear-worn electronic devices will typically include at least 2 charge ports for charging left and right ear-worn electronic devices.

In some embodiments, the wearable apparatus is not intended to be worn when one or more DUCs are positioned within charge ports of the strap arrangement. For example, a strap arrangement configured to receive and charge a pair of ear-worn electronic devices is typically not comfortably wearable during charging of the devices. In other embodiments, the wearable apparatus is intended to be worn when one or more DUCs are positioned within charge ports of the strap arrangement. For example, a strap arrangement configured to receive and charge one or more sensor pods, motion pods, control pods, communication pods, or a combination of these pods can be comfortably wearable during charging of these devices.

Figure 7A:
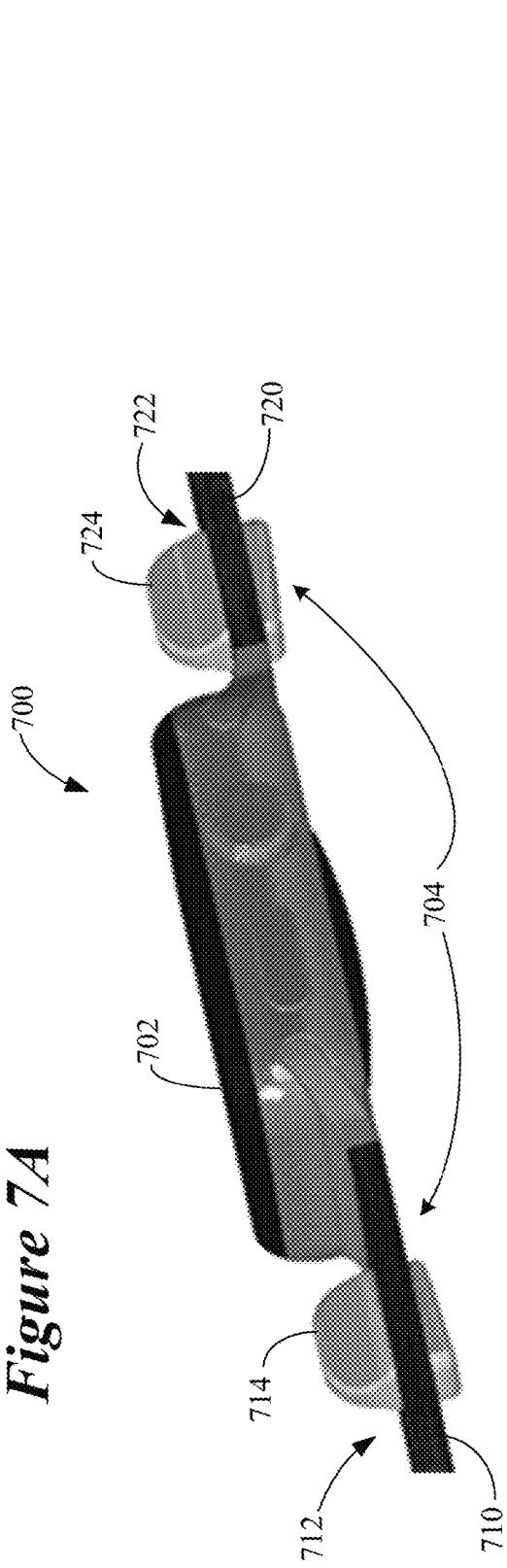
FIGS. 7A and 7B illustrate a wearable apparatus configured to charge at least two DUCs in accordance with various embodiments.
Figure 7B:
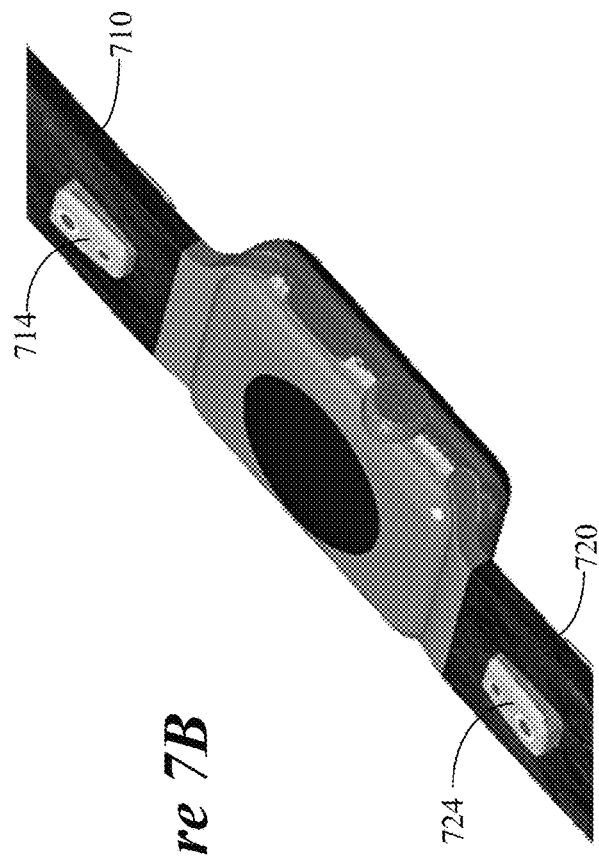

FIGS. 7A and 7B illustrate a wearable apparatus configured to charge at least two DUCs in accordance with various embodiments. The wearable apparatus 700 shown in FIGS. 7A and 7B includes a wearable electronic device 702 connected to a strap arrangement 704. The strap arrangement 704 includes a first strap 710 (partially shown) and a second strap 720 (partially shown). The first strap 710 includes a first charge port 712 configured to receive and electrically communicate with a first DUC 714. The second strap 720 includes a second charge port 722 configured to receive and electrically communicate with a second DUC 724. In the representative example shown in FIGS. 7A and 7B, the first and second DUCs 714, 724 are representative of first and second physiologic sensor pods. The first and second physiologic sensor pods 714, 724 can include any of the physiologic sensors or combination of sensors described herein. As is best seen in FIG. 7B, the first and second physiologic sensor pods 714, 724 include one or more sensing elements that couple to the wearer's skin when the wearable apparatus is secured to a body part (e.g., wrist or ankle) of the user.

Figure 8:
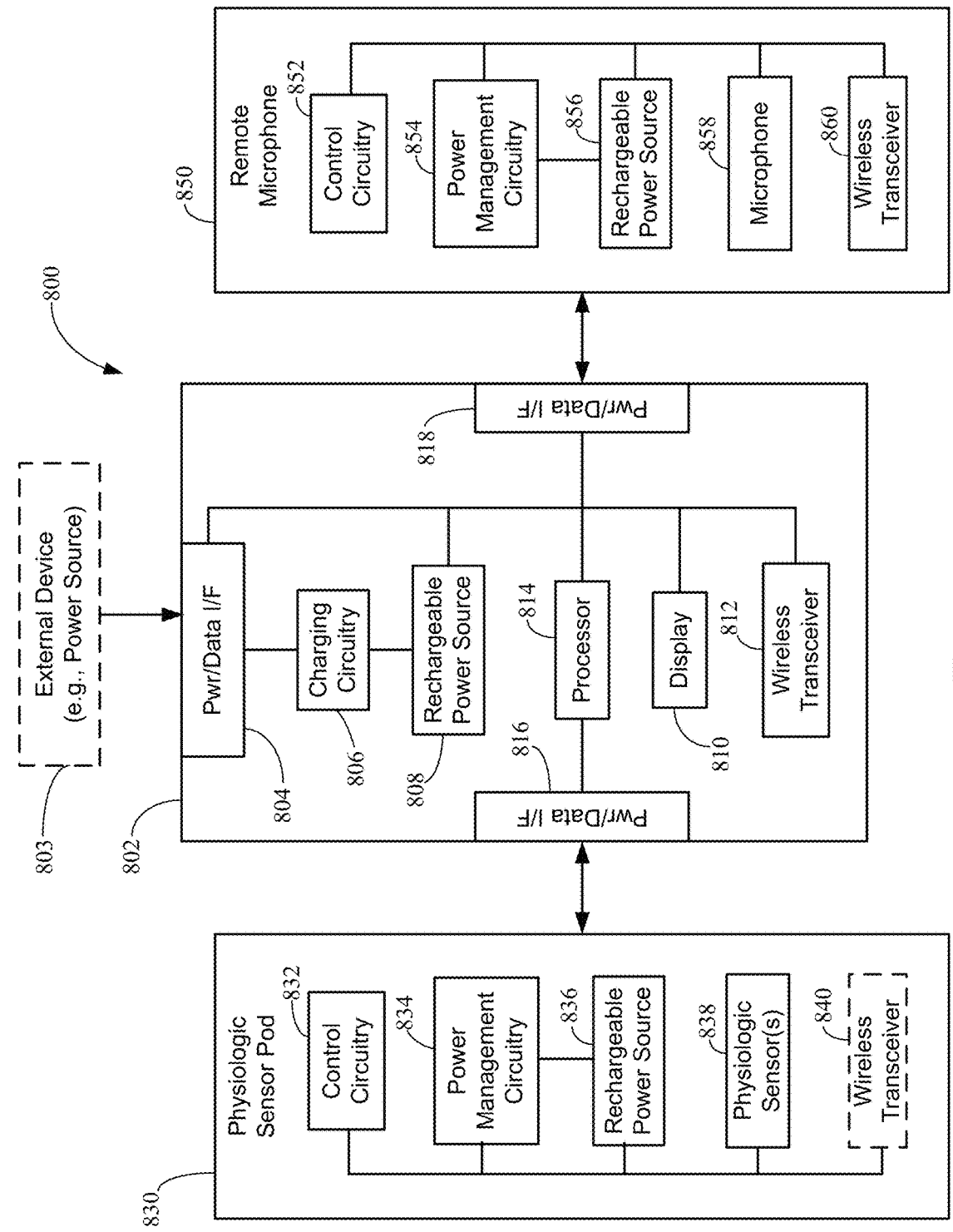
FIG. 8 is a block diagram of a wearable apparatus configured to charge at least two DUCs in accordance with various embodiments.

FIG. 8 is a block diagram of a wearable apparatus configured to charge at least two DUCs in accordance with various embodiments. The wearable apparatus 800 shown in FIG. 8 includes a wearable electronic device 802 communicatively coupled to a first DUC 830 and a second DUC 850. As previously described, the first and second DUCs 830, 850 are received by respective charge ports of a strap arrangement of the wearable apparatus, which provide electrical communication between the first and second DUCs 830, 850 and the wearable electronic device 802. The wearable electronic device 802 includes an interface 804 configured to communicatively couple to an external source/device 803. In some embodiments, the interface 804 is a power interface configured to receive electrical power from the external source/device 803. In other embodiments, the interface 804 is a power/data interface configured to receive electrical power from the external source/device 803 and provide communication of data and/or control signals between the external source/device 803 and the wearable electronic device 802. In further embodiments, a rechargeable power source 808 of the wearable electronic device 802 is configured to be inductively charged via an external inductive charger, in which case the interface 804 can be configured to effect data and/or control signal communications with the external source/device 803.

The rechargeable power source 808 of the wearable electronic device 802 is coupled to charging circuitry 806 which receives power from the interface 804 or wirelessly via inductive charging. The charging circuitry 806 is configured to control charging of the rechargeable power source 808. In accordance with some embodiments, the charging circuitry 806 facilitates charging of rechargeable power sources 836, 856 of the first and second DUCs 830, 850 via interfaces 816, 818.

The charging circuitry 806 and processor 814 of the wearable electronic device 802 can be configured to coordinate charging of the rechargeable power sources 836, 856 of the first and second DUCs 830, 850 while concurrently charging the rechargeable power source 808 of the wearable electronic device 802 via the external source/device 803 (or via an inductive charger). Alternatively or in addition, the charging circuitry 806 and processor 814 of the wearable electronic device 802 can be configured to coordinate charging of the rechargeable power sources 836, 856 of the first and second DUCs 830, 850 when the wearable electronic device 802 is disconnected from the external source/device 803 (or an inductive charger). As such, the rechargeable power source 808 of the wearable electronic device 802 serves as the source of power for recharging the rechargeable power sources 836, 856 of the first and second DUCs 830, 850. According to various embodiments, the rechargeable power sources 808, 836, 856 can be charged using a conventional charging methodology, an accelerated charging methodology, or a combination of accelerated and conventional charging methodologies.

The wearable electronic device 802 also includes a display 810 (e.g., LCD, LED, OLED, e-ink) and a wireless transceiver 812, such as a Bluetooth® or other transceiver described herein. A processor 814 is operably coupled to the components 804, 806, 808, 812, 814, 816, 818 of the wearable electronic device 802. The processor 814 is configured to control operations and functions of the wearable electronic device 802 and, together with the charging circuitry 806 and rechargeable power source 808, coordinate charging of the rechargeable power sources 836, 856 of the first and second DUCs 830, 850.

For purposes of illustration and not of limitation, the first DUC 830 is representative of a physiologic sensor pod. The physiologic sensor pod 830 includes control circuitry 832, which may include a processor, controller, or other digital logic device. The physiologic sensor pod 830 also includes power management circuitry 834 coupled to rechargeable power source 836. Power management circuitry 834 of the physiologic sensor pod 830 is configured to cooperate with the charging circuitry 806 and processor 814 of the wearable electronic device 802 to implement conventional and/or accelerated charging of the rechargeable power source 836.

The physiologic sensor pod 830 includes one or more physiologic sensors 838 configured to sense one or more physiologic signals and/or conditions of the wearer of the wearable apparatus 800 (see representative physiologic signals and sensors disclosed herein). Physiologic sensor data produced by the one or more physiologic sensors 838 is communicated from the physiologic sensor pod 830 to the wearable electronic device 802 via interface 816. In some embodiments, the physiologic sensor pod 830 includes a wireless transceiver 840 configured to communicate physiologic sensor data to the wireless transceiver 812 of the wearable electronic device 802.

For purposes of illustration and not of limitation, the second DUC 850 is representative of a remote or portable microphone. The remote microphone 850 can be used in conjunction with one or more ear-worn electronic devices to allow the wearer to receive audio from a location at which the remote microphone 850 is placed. The remote microphone 850 includes one or more microphones 858 (e.g., a microphone array). According to an illustrative example, the remote microphone 850 can be placed near the front of a room in proximity of a person giving a speech, while the wearer of the wearable apparatus 800 is sitting towards the back of the room. Audio from the person giving the speech can be transmitted from the remote microphone 850 via a wireless transceiver 860 to the wireless transceiver 812 of the wearable electronic device 802. Audio received by the wearable electronic device 802 from the remote microphone 850 can be transmitted to ear-worn electronic devices worn by the wearer via the wireless transceiver 812 or via a wired connection. In some embodiments, the remote microphone 850 can be configured to communicate audio picked up by the microphone 858 directly to a wireless transceiver of an ear-worn electronic device(s), thereby bypassing the wearable electronic device 802.

The remote microphone 850 includes control circuitry 852, which may include a processor, controller, or other digital logic device. The remote microphone 850 also includes power management circuitry 854 coupled to rechargeable power source 856. Power management circuitry 854 of the remote microphone 850 is configured to cooperate with the charging circuitry 806 and processor 814 of the wearable electronic device 802 to implement conventional and/or accelerated charging of the rechargeable power source 856.

Various types of data can be communicated between the wearable electronic device 802 and the first and second DUCs 830, 850. For example, power source status (e.g., SoC), charging status, maintenance messages, device use/user statistics, sensor data, audio and other data can be communicated between the wearable electronic device 802 and the first and second DUCs 830, 850.

Figure 9:
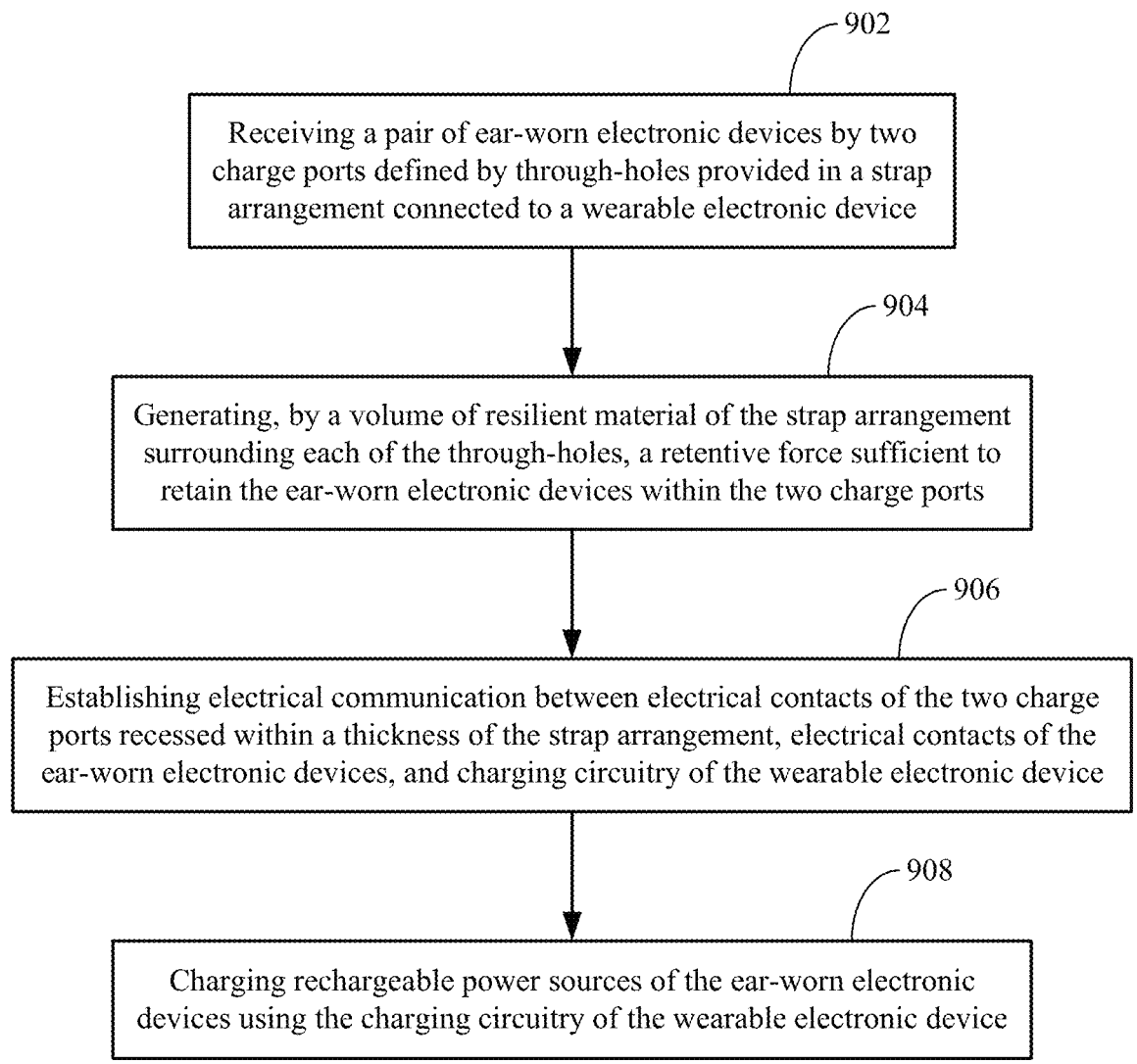
FIG. 9 is a flowchart illustrating a method for charging DUCs using a wearable electronic device comprising a strap arrangement with charge ports in accordance with various embodiments.

FIG. 9 is a flowchart illustrating a method for charging DUCs using a wearable electronic device comprising a strap arrangement with charge ports in accordance with various embodiments. The method illustrated in FIG. 9 involves receiving 902 a pair of ear-worn electronic devices by two charge ports defined by through-holes provided in a strap arrangement connected to a wearable electronic device. The method involves generating 904, by a volume of resilient material of the strap arrangement surrounding each of the through-holes, a retentive force sufficient to retain the ear-worn electronic devices within the two charge ports. The method also involves establishing 906 electrical communication between electrical contacts of the two charge ports recessed within a thickness of the strap arrangement, electrical contacts of the ear-worn electronic devices, and charging circuitry of the wearable electronic device. The method further involves charging 908 rechargeable power sources of the ear-worn electronic devices using the charging circuitry of the wearable electronic device. Although the representative example shown in FIG. 9 is directed to charging a pair of ear-worn electronic devices, it is understood that other electronic devices and pods can be charged in accordance with the methodology illustrated in FIG. 9.

Figure 10:
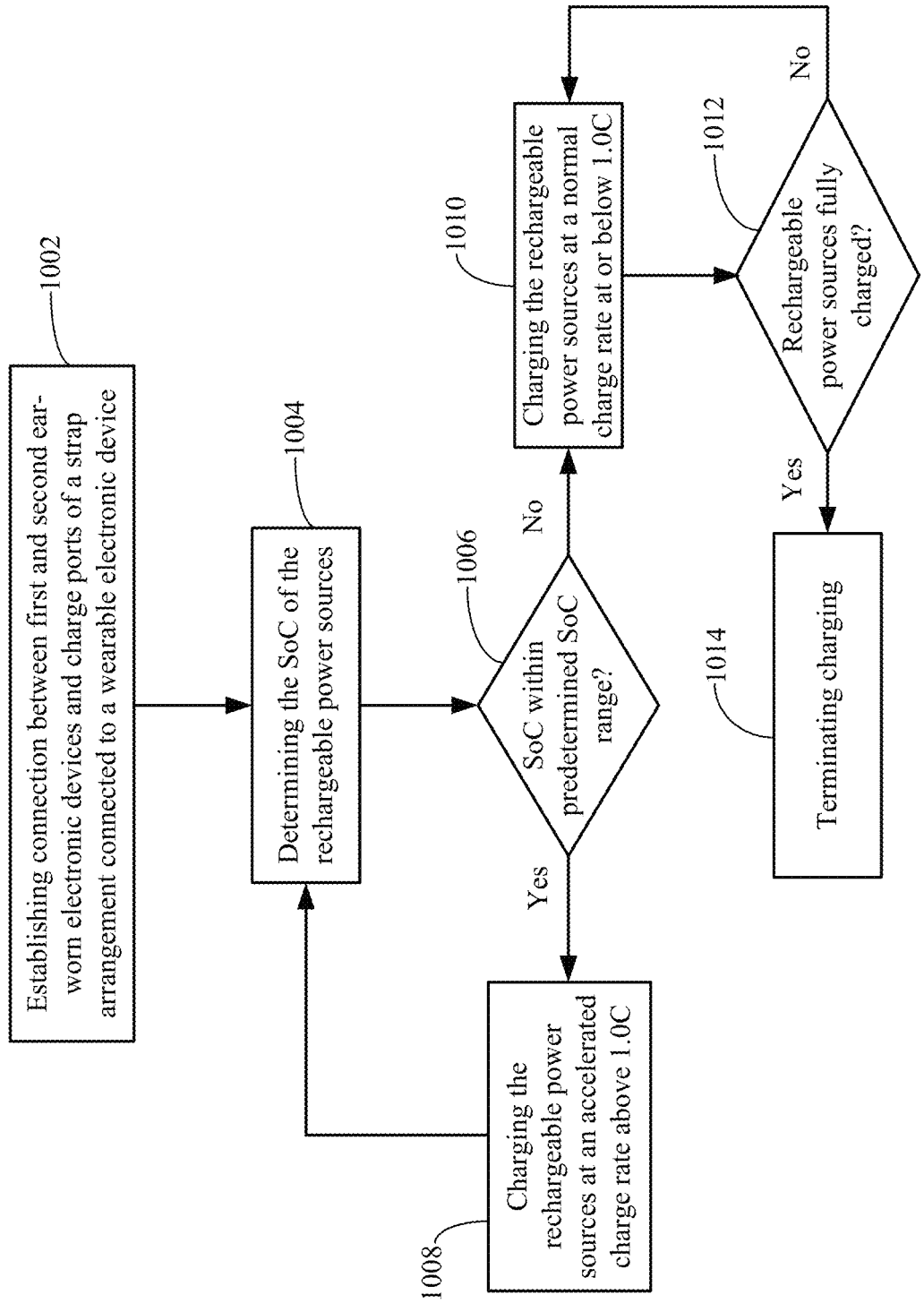
FIG. 10 illustrates a method of implementing accelerated charging of at least two DUCs using charge ports provided in a strap arrangement coupled to a wearable electronic device in accordance with various embodiments.

FIG. 10 illustrates a method of implementing accelerated charging of at least two DUCs using charge ports provided in a strap arrangement coupled to a wearable electronic device in accordance with various embodiments. In the illustrative method shown in FIG. 10, two ear-worn electronic devices are subject to accelerated charging via charge ports provided in the strap arrangement. The method shown in FIG. 10 involves establishing connection 1002 between first and second ear-worn electronic devices and first and second charge ports provided in the strap arrangement. The method involves determining 1004 the state of charge (SoC) of the rechargeable power sources of the ear-worn electronic devices. A check 1006 is made to determine if the SoC of the rechargeable power sources is within a predetermined SoC range (e.g., 5-35%). If the SoC of the rechargeable power sources fall within the predetermined SoC range, the method involves charging 1008 the rechargeable power sources at an accelerated charge rate above 1.0 C (e.g., 1.5 C-3.0 C). Accelerated charging continues while the SoC of the rechargeable power sources remain within the predetermined SoC range. Accelerated charging is discontinued when the SoC of the rechargeable power sources is beyond the predetermined SoC range. In some embodiments, accelerated charging is discontinued in response to expiration of a predetermined time limit (e.g., 15 minutes), reaching a predetermined voltage limit (e.g., 4.1V), or reaching a predetermined energy limit (e.g., 7.5 mAh).

At the termination of accelerated charging, the wearer of the wearable apparatus may remove the ear worn electronic devices from the charge ports of the strap arrangement and immediately use the devices. As was discussed previously, five minutes of accelerated charging allows the ear worn electronic devices to be used for between 2 and 6 hours of normal operation. Rather than using the ear worn electronic devices after termination of accelerated charging, the method can involve charging 1010 the rechargeable power sources at a normal charge rate at or below 1.0 C. A check 1012 is made to determine if rechargeable power sources are fully charged. If not, charging at the normal charge rate continues. When the rechargeable power sources are fully charged, the charging procedure is terminated 1014. Although the representative example shown in FIG. 10 is directed to charging a pair of ear-worn electronic devices, it is understood that other electronic devices and pods can be charged in accordance with the methodology illustrated in FIG. 10. Accelerated charging can be implemented in accordance with the teachings disclosed in commonly-owned U.S. patent application Ser. No. 16/012,399 (Higgins et al.), filed on Jun. 19, 2018 and entitled PORTABLE CHARGING UNIT WITH ACCELERATED CHARGING FOR HEARING ASSISTANCE DEVICES, which is incorporated herein by reference.

Figure 11:
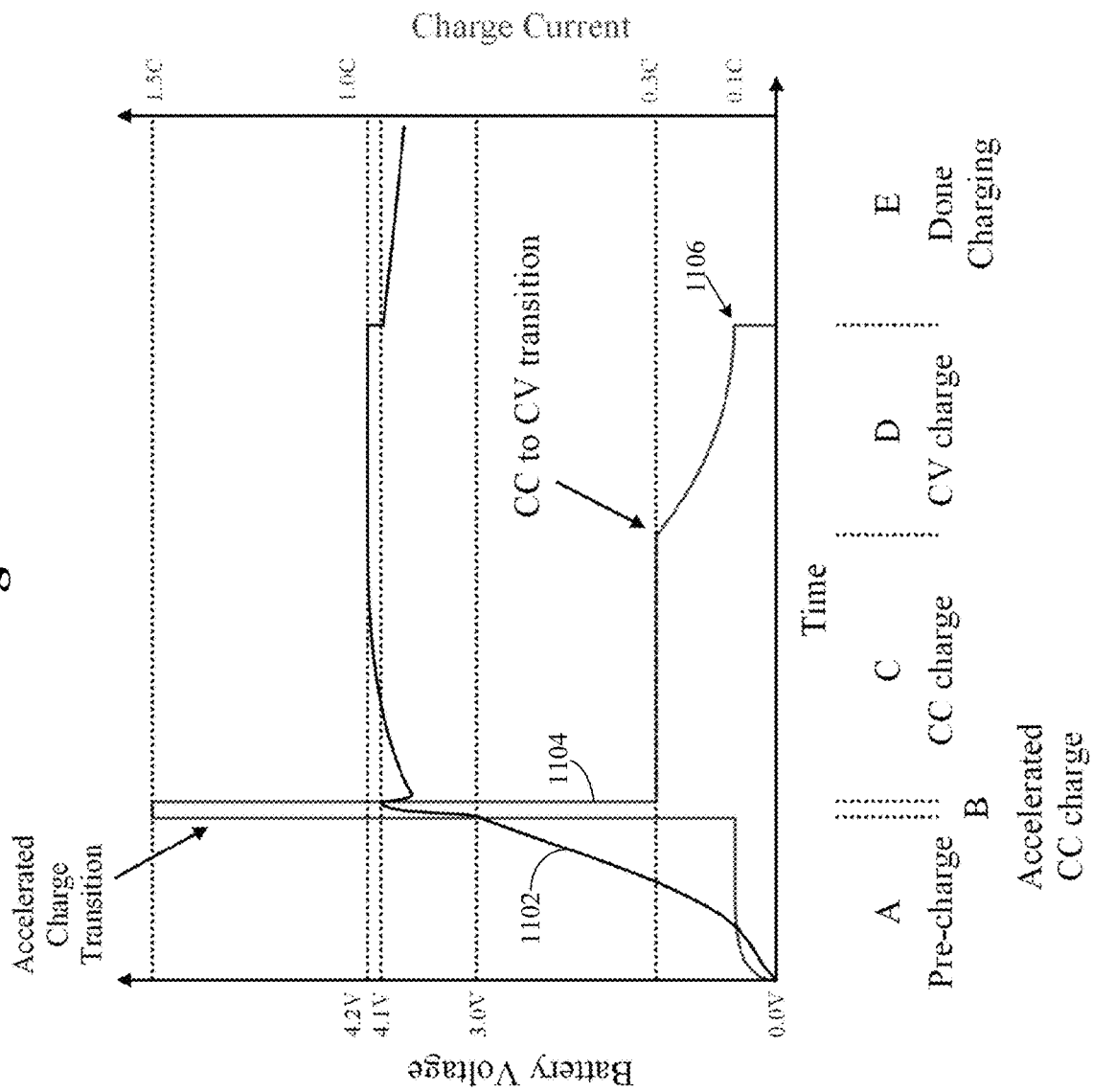
FIG. 11 is a graph that characterizes accelerated charging of a lithium-ion battery of a DUC in accordance with various embodiments.

FIG. 11 is a graph that characterizes accelerated charging of a lithium-ion battery of a DUC (e.g., an ear-worn electronic device or other electronic pod) in accordance with various embodiments. The graph of FIG. 11 characterizes battery voltage 1102 and charge current 1104 as a function of time during different phases of a charging procedure. As is indicated below the time axis, the different phases of the charging procedure include a pre-charge phase (A), an accelerated constant current charge phase (B), a constant voltage charge phase (D), and a charge complete phase (E). During the pre-charge phase (A), the charge current 1104 is low (e.g., 0.1 C) and the battery voltage 1102 slowly increases. It is noted that a well-designed system should stay out of this regime. The pre-charge phase (A) continues until the battery voltage 1102 reaches 3.0 V, at which time the accelerated constant current charge phase (B) is initiated.

During the accelerated charging phase (B), the charge current 1104 rapidly increases to a charge rate above 1.0 C, such as 1.5 C. During the accelerated charging phase (B), high current is supplied to the battery which results in a rapid increase in battery voltage 1102. For example, a charge current of 5 mA can be supplied to the battery during the latter part of the pre-charge phase (A) (e.g., at 0.3 C). The charge current can be increased to between 17 and 24 mA during the accelerated charging phase (B). The accelerated charging phase (B) continues until a predetermined time limit (e.g., 5-15 min) has been reached. In some embodiments, the accelerated charging phase (B) continues until a predetermined battery voltage 1102 (e.g., 4.1 V) or predetermined energy level (e.g., 7.5 mAh) has been reached.

At the conclusion of the accelerated charging phase (B), the charge current 1104 rapidly decreases to a normal charge current level (e.g., 5 mA at a charge rate of 0.3 C) at the initiation of the constant current charge phase (C). During the constant current charge phase (C), a normal charge current (e.g., 5 mA) is supplied to the battery resulting in a continued increase in the battery voltage 1102. When the battery voltage 1102 reaches a predetermined level (e.g., 4.2 V), the charging procedure transitions from the constant current charge phase (C) to the constant voltage charge phase (D). During the constant voltage charge phase (D), the charge current 1104 decreases until a cutoff 1106 is reached, at which time the charging procedure is terminated. It is noted that at the charging complete phase (E), the battery voltage 1102 slightly drops over time (e.g., from 4.1 V to 3.9 V). In the embodiment shown in the FIG. 11, the charge current 1104 supplied during the accelerated charging phase (B) changes in a step-wise fashion. It is understood that, in some embodiments, the charge current 1104 can decrease gradually as the accelerated charging phase (B) transitions to the constant current charge phase (C).

Figure 12B:
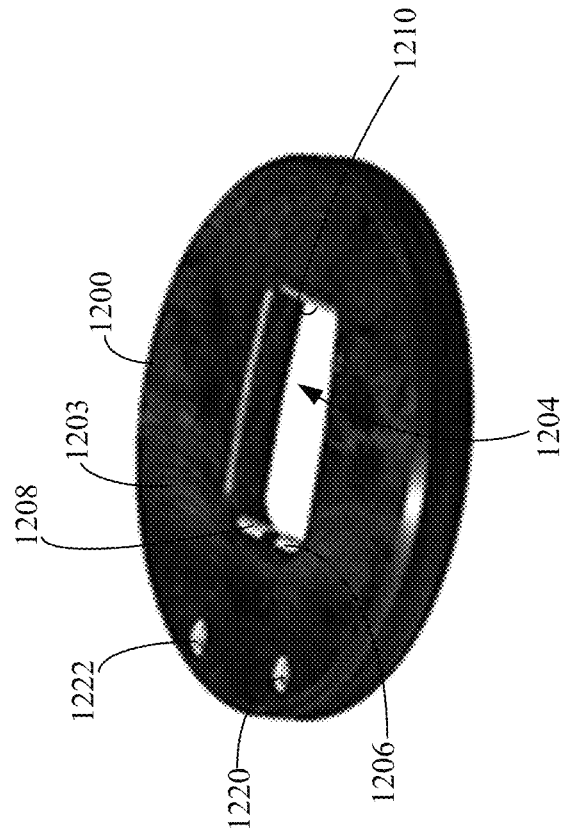
FIGS. 12A and 12B illustrate a charge port insert configured to receive and electrically communicate with a DUC in accordance with various embodiments.
Figure 12A:
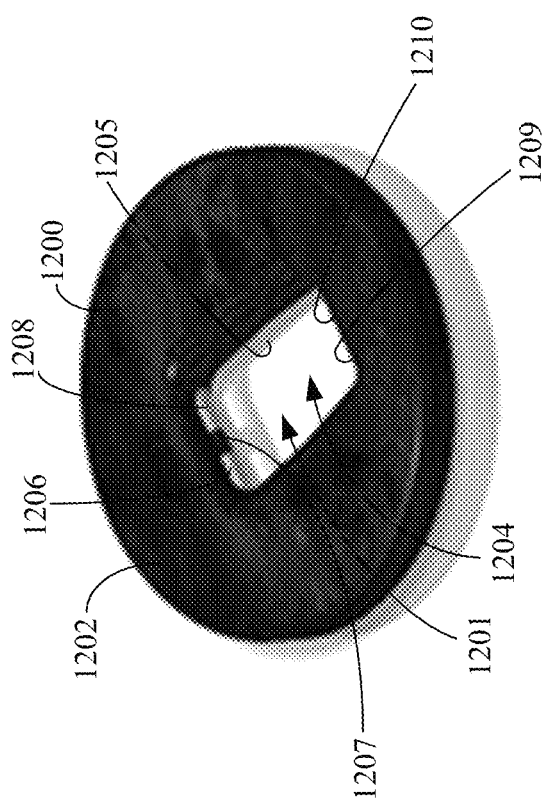

FIGS. 12A and 12B illustrate a charge port insert configured to receive and electrically communicate with a DUC in accordance with various embodiments. FIG. 12A shows a top view of the charge port insert 1200, and FIG. 12 B shows a bottom view of the charge port insert 1200. The charge port insert 1200 is configured to be received by a separate structure that includes charging circuitry for charging a DUC positioned within the charge port insert 1200. For example, the charge port insert 1200 can be configured to be placed into and removed from a charging receptacle of a separate charging apparatus, such as a charging station. According to various embodiments, the charge port insert 1200 comprises an elastomeric insert with over-molded charging contacts and an optional tactile retention feature.

The charge port insert 1200 includes a charge port 1201 comprising a volume of resilient material 1202 and a through-hole 1204 provided in the volume of resilient material 1202. In some embodiments, the body of the charge port insert 1200 is defined by the resilient material 1202. In other embodiments, the region surrounding the charge port 1201 comprises the volume of resilient material 1202, and inelastic material (e.g., plastic) is bonded to and surrounds the volume of resilient material 1202. The resilient material 1202 can be formed from a material previously described, and is configured to stretch and generate a retentive force sufficient to retain a DUC within the through-hole 1204.

The through-hole 1204 includes a wall 1205 having a first side 1207 and a second side 1209. Electrical contacts 1206, 1208 are disposed on the first side 1207 of the wall 1205 and are recessed within a thickness of the volume of resilient material 1204 relative to an external surface of the charge port insert 1200. A retention pin 1210 can be disposed on the second side 1209 of the wall 1205. As was previously described, the retention pin 1210 and/or the electrical contacts 1206, 1208 provide tactile feedback when a DUC is properly positioned within the through-hole 1204. It is understood that the charge port 1201 can have various configurations, such as those shown in FIGS. 2 and 3.

As is shown in FIG. 12 B, charging contacts 1220, 1222 are disposed on the bottom surface 1203 of the charge port insert 1200. Charging contacts 1220, 1222 are electrically coupled to electrical contacts 1206, 1208 of the charge port 1201 via conductors or traces. Charging contacts 1220, 1222 are configured to establish electrical connection with corresponding charging contacts of a charging receptacle into which the charge port insert 1200 is positioned. The charge port insert 1200 can include an alignment feature, such as a tab or a channel, that engages a corresponding alignment feature of the charging receptacle to provide for proper alignment when installing the charge port insert 1200 into the charging receptacle.

Various embodiments disclosed herein are described as being implemented at least in part by a processor (e.g., processor 108, 814), which can be representative of any combination of one or more logic devices (e.g., multi-core processors), filters (e.g., FIR filter, Kalman filter), memory (Flash, RAM, ROM etc.), other digital logic circuitry (e.g., ASICs, FPGAs), and software configured to implement communication with and charging of DUCs in a manner described herein.

In general, communication with and charging of DUCs by a wearable electronic device described herein may be implemented in hardware, software, firmware, or any combination thereof. Various features described or illustrated as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques disclosed herein may be realized at least in part by a computer-readable data storage medium (e.g., ROM, RAM, SDRAM, NVRAM, EEPROM, FLASH) comprising instructions that, when executed, cause a processor to perform one or more of the methods described herein. For example, the computer-readable data storage medium may store such instructions for execution by a processor.

The code or instructions may be software and/or firmware executed by processing circuitry including one or more processors, such as one or more DSPs, general purpose microprocessors, ASICs, FPGAs, ASSPs, or other equivalent integrated or discrete logic circuitry. Accordingly, the term "processor," as used herein may refer to any of the foregoing structures or any other structure suitable for implementation of the techniques described herein. In addition, in some aspects, functionality described in this disclosure may be provided within software modules or hardware modules. These and other aspects are within the scope of the claims appended hereto.

This document discloses numerous embodiments, including but not limited to the following:

Item 1 is a wearable apparatus configured to charge at least a pair of ear-worn electronic devices, the apparatus comprising:

a wearable electronic device comprising a rechargeable power source, charging circuitry, a processor, and a display; and a strap arrangement connected to the wearable electronic device and comprising at least two charge ports, each of the charge ports electrically coupled to the wearable electronic device and comprising:

a volume of resilient material comprising a through-hole dimensioned to receive one of the ear-worn electronic devices, the volume of resilient material configured to stretch and generate a retentive force sufficient to retain the ear-worn electronic device within the through-hole; and electrical contacts disposed on a wall of the volume of resilient material defining the through-hole and recessed within a thickness of the volume of resilient material, the electrical contacts configured to electrically communicate with corresponding electrical contacts of the ear-worn electronic device;

wherein the charging circuitry of the wearable electronic device is configured to charge rechargeable power sources of the ear-worn electronic devices.

Item 2 is the apparatus of item 1, wherein the electrical contacts of each of the charge ports are configured to generate tactile feedback in response to mechanical engagement with the corresponding electronic contacts of the ear-worn electronic device.

Item 3 is the apparatus of item 1, wherein each of the charge ports comprises a retention pin disposed on the wall of the volume of resilient material and recessed within the thickness of the volume of resilient material, the retention pin configured to generate tactile feedback in response to mechanical engagement with a corresponding retention feature of the ear-worn electronic device.

Item 4 is the apparatus of item 1, wherein at least a portion of the ear-worn electronic device passes entirely through the through-hole when received by the charge port.

Item 5 is the apparatus of item 1, wherein:

the wearable electronic device comprises an interface configured to receive power from an external source; and the charging circuitry of the wearable electronic device is configured to charge the rechargeable power source of the wearable electronic device and the rechargeable power sources of the ear-worn electronic devices in response to power received by the interface.

Item 6 is the apparatus of item 1, wherein:

the wearable electronic device comprises an interface configured to receive power from an external source; and the charging circuitry of the wearable electronic device is configured to charge the rechargeable power sources of the ear-worn electronic devices using the rechargeable power source of the wearable electronic device in response to an absence of power received by the interface.

Item 7 is the apparatus of item 1, wherein the charging circuitry of the wearable electronic device is configured to charge the rechargeable power sources of the ear-worn electronic devices at an accelerated charge rate above 1.0 C when a state of charge (SoC) of the rechargeable power sources is within a predetermined SoC range.

Item 8 is the apparatus of item 1, wherein the processor is configured to present charging information including charge state on the display for the rechargeable power source of the wearable electronic device and the rechargeable power sources of the ear-worn electronic devices.

Item 9 is the apparatus of item 1, wherein the strap arrangement comprises:

a first strap comprising at least a first charge port; and a second strap comprising at least a second charge port.

Item 10 is the apparatus of item 1, wherein the strap arrangement comprises a one-piece strap comprising the at least two charge ports.

Item 11 is the apparatus of item 1, wherein at least one of the charge ports is configured to receive a physiologic sensor pod, the physiologic sensor pod comprising at least one physiologic sensor, a rechargeable power source, and electrical contacts configured to mechanically engage the electrical contacts of the at least one of the charge ports.

Item 12 is the apparatus of item 1, wherein at least one of the charge ports is configured to receive a wireless microphone pod, the wireless microphone pod comprising at least one microphone, a rechargeable power source, a wireless communication device, and electrical contacts configured to mechanically engage the electrical contacts of the at least one of the charge ports.

Item 13 is the apparatus of item 1, wherein at least one of the charge ports is configured to receive a motion sensor pod, the motion sensor pod comprising at least one motion sensor, a rechargeable power source, and electrical contacts configured to mechanically engage the electrical contacts of the at least one of the charge ports.

Item 14 is the apparatus of item 1, comprising electrical conductors disposed within the thickness of the strap arrangement, the electrical conductors connected to and extending between the at least two charge ports and electrical contacts of the strap arrangement configured to electrically communicate with electrical contacts of the wearable electronic device.

Item 15 is a method of charging at least a pair of ear-worn electronic devices, the method comprising:

receiving the pair of ear-worn electronic devices by two charge ports defined by through-holes provided in a strap arrangement connected to a wearable electronic device;

generating, by a volume of resilient material of the strap arrangement surrounding each of the through-holes, a retentive force sufficient to retain the ear-worn electronic devices within the two charge ports;

establishing electrical communication between electrical contacts of the two charge ports recessed within a thickness of the volume of resilient material, electrical contacts of the ear-worn electronic devices, and charging circuitry of the wearable electronic device; and charging rechargeable power sources of the ear-worn electronic devices using the charging circuitry of the wearable electronic device.

Item 16 is the method of item 15, comprising generating tactile feedback in response to establishing mechanical engagement between the electrical contacts of the two charge ports and the electrical contacts of the ear-worn electronic devices.

Item 17 is the method of item 15, comprising generating tactile feedback in response to mechanical engagement between a retention pin disposed in each of the two charge ports and a retention feature of the ear-worn electronic devices.

Item 18 is the method of item 15, wherein receiving the pair of ear-worn electronic devices by the two charge ports comprises passing at least a portion of the ear-worn electronic devices entirely through the through-holes of the two charge ports.

Item 19 is the method of item 15, comprising:

supplying power from an external source to the wearable electronic device; and charging the rechargeable power source of the wearable electronic device and the rechargeable power sources of the ear-worn electronic devices in response to the power supplied to the wearable electronic device.

Item 20 is the method of item 15, comprising charging the rechargeable power sources of the ear-worn electronic devices using the rechargeable power source of the wearable electronic device in response to an absence of external power supplied to the wearable electronic device.

Item 21 is the method of item 15, comprising charging the rechargeable power sources of the ear-worn electronic devices at an accelerated charge rate above 1.0 C when a state of charge (SoC) of the rechargeable power sources is within a predetermined SoC range.

Item 22 is the method of item 15, comprising presenting, on a display of the wearable electronic device, charging information including charge state for the rechargeable power source of the wearable electronic device and the rechargeable power sources of the ear-worn electronic devices.

Item 23 is the method of item 15, comprising:

receiving one or more physiologic sensor pods by one or more sensor charge ports defined by through-holes provided in a volume of resilient material of the strap arrangement;

sensing one or more physiologic signals or conditions of a wearer of the strap arrangement using the one or more physiologic sensor pods; and communicating physiologic data from the one or more physiologic sensor pods to the wearable electronic device.

Item 24 is the method of item 15, comprising:

receiving one or more motion sensor pods by one or more sensor charge ports defined by through-holes provided in a volume of resilient material of the strap arrangement;

sensing motion of a wearer of the strap arrangement using the one or more motion sensor pods; and communicating motion data from the one or more motion sensor pods to the wearable electronic device.

Item 25 is a wearable apparatus configured to charge one or more electronic devices, the apparatus comprising:

a wearable electronic device comprising a rechargeable power source, charging circuitry, a processor, and a display; and a strap arrangement connected to the wearable electronic device and comprising one or more charge ports, each of the charge ports electrically coupled to the wearable electronic device and comprising:

a volume of resilient material comprising a through-hole dimensioned to receive one of the electronic devices, the volume of resilient material configured to stretch and generate a retentive force sufficient to retain the electronic device within the through-hole; and electrical contacts disposed on a wall of the volume of resilient material defining the through-hole and recessed within a thickness of the volume of resilient material, the electrical contacts configured to electrically communicate with corresponding electrical contacts of the electronic device;

wherein the charging circuitry of the wearable electronic device is configured to a charge rechargeable power source of the one or more electronic devices.

Item 26 is the apparatus of item 25, wherein at least one of the charge ports is configured to receive a physiologic sensor pod, the physiologic sensor pod comprising at least one physiologic sensor, a rechargeable power source, and electrical contacts configured to mechanically engage the electrical contacts of the at least one of the charge ports.

Item 27 is the apparatus of item 25, wherein at least one of the charge ports is configured to receive a wireless microphone pod, the wireless microphone pod comprising at least one microphone, a rechargeable power source, a wireless communication device, and electrical contacts configured to mechanically engage the electrical contacts of the at least one of the charge ports.

Item 28 is the apparatus of item 25, wherein at least one of the charge ports is configured to receive a motion sensor pod, the motion sensor pod comprising at least one motion sensor, a rechargeable power source, and electrical contacts configured to mechanically engage the electrical contacts of the at least one of the charge ports.

Item 29 is the apparatus of item 25, comprising any or a combination of the features of items 1-10 and 14.

Item 30 is a method of charging one or more electronic devices, the method comprising:

receiving the one or more electronic devices by one or more charge ports defined by through-holes provided in a strap arrangement connected to a wearable electronic device;

generating, by a volume of resilient material of the strap arrangement surrounding each of the through-holes, a retentive force sufficient to retain the one or more electronic devices within the one or more charge ports;

establishing electrical communication between electrical contacts of the one or more charge ports recessed within a thickness of the volume of resilient material, electrical contacts of the one or more electronic devices, and charging circuitry of the wearable electronic device; and charging a rechargeable power source of the one or more electronic devices using the charging circuitry of the wearable electronic device.

Item 31 is the method of item 30, wherein the one or more electronic devices comprises one or more physiologic sensor pods, each physiologic sensor pod comprising at least one physiologic sensor, a rechargeable power source, and electrical contacts configured to mechanically engage the electrical contacts of the one or more charge ports.

Item 32 is the method of item 30, wherein the one or more electronic devices comprises one or more wireless microphone pods, each wireless microphone pod comprising at least one microphone, a rechargeable power source, a wireless communication device, and electrical contacts configured to mechanically engage the electrical contacts of the one or more charge ports.

Item 33 is the method of item 30, wherein the one or more electronic devices comprises one or more motion sensor pods, each motion sensor pod comprising at least one motion sensor, a rechargeable power source, and electrical contacts configured to mechanically engage the electrical contacts of the one or more charge ports.

Item 34 is the method of item 30, wherein the one or more electronic devices comprises one or more control pods, each control pod comprising control circuitry configured to control circuitry or functions of the wearable electronic device or another device, a rechargeable power source, and electrical contacts configured to mechanically engage the electrical contacts of the one or more charge ports.

Item 35 is the method of item 30, comprising any or a combination of the features of items 16-24.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A wearable apparatus configured to charge at least a pair of ear-worn electronic devices, the apparatus comprising:
   a wearable electronic device comprising a rechargeable power source, charging circuitry, a processor, and a display; and
   a strap arrangement connected to the wearable electronic device and comprising at least two charge ports, each of the charge ports electrically coupled to the wearable electronic device and comprising:
      a volume of resilient material comprising a through-hole dimensioned to receive one of the ear-worn electronic devices, the volume of resilient material configured to stretch and generate a retentive force sufficient to retain the ear-worn electronic device within the through-hole; and
      electrical contacts disposed on a wall of the volume of resilient material defining the through-hole and recessed within a thickness of the volume of resilient material, the electrical contacts configured to electrically communicate with corresponding electrical contacts of the ear-worn electronic device;
   wherein the charging circuitry of the wearable electronic device is configured to charge rechargeable power sources of the ear-worn electronic devices.

2. The apparatus of claim 1, wherein the electrical contacts of each of the charge ports are configured to generate tactile feedback in response to mechanical engagement with the corresponding electronic contacts of the ear-worn electronic device.

3. The apparatus of claim 1, wherein each of the charge ports comprises a retention pin disposed on the wall of the volume of resilient material and recessed within the thickness of the volume of resilient material, the retention pin configured to generate tactile feedback in response to mechanical engagement with a corresponding retention feature of the ear-worn electronic device.

4. The apparatus of claim 1, wherein at least a portion of the ear-worn electronic device passes entirely through the through-hole when received by the charge port.

5. The apparatus of claim 1, wherein:
   the wearable electronic device comprises an interface configured to receive power from an external source; and
   the charging circuitry of the wearable electronic device is configured to charge the rechargeable power source of the wearable electronic device and the rechargeable power sources of the ear-worn electronic devices in response to power received by the interface.

6. The apparatus of claim 1, wherein:
   the wearable electronic device comprises an interface configured to receive power from an external source; and
   the charging circuitry of the wearable electronic device is configured to charge the rechargeable power sources of the ear-worn electronic devices using the rechargeable power source of the wearable electronic device in response to an absence of power received by the interface.

7. The apparatus of claim 1, wherein the charging circuitry of the wearable electronic device is configured to charge the rechargeable power sources of the ear-worn electronic devices at an accelerated charge rate above 1.0 C when a state of charge (SoC) of the rechargeable power sources is within a predetermined SoC range.

8. The apparatus of claim 1, wherein the processor is configured to present charging information including charge state on the display for the rechargeable power source of the wearable electronic device and the rechargeable power sources of the ear-worn electronic devices.

9. The apparatus of claim 1, wherein the strap arrangement comprises:
   a first strap comprising at least a first charge port; and
   a second strap comprising at least a second charge port.

10. The apparatus of claim 1, wherein the strap arrangement comprises a one-piece strap comprising the at least two charge ports.

11. The apparatus of claim 1, wherein at least one of the charge ports is configured to receive a physiologic sensor pod, the physiologic sensor pod comprising at least one physiologic sensor, a rechargeable power source, and electrical contacts configured to mechanically engage the electrical contacts of the at least one of the charge ports.

12. The apparatus of claim 1, wherein at least one of the charge ports is configured to receive a wireless microphone pod, the wireless microphone pod comprising at least one microphone, a rechargeable power source, a wireless communication device, and electrical contacts configured to mechanically engage the electrical contacts of the at least one of the charge ports.

13. The apparatus of claim 1, wherein at least one of the charge ports is configured to receive a motion sensor pod, the motion sensor pod comprising at least one motion sensor, a rechargeable power source, and electrical contacts configured to mechanically engage the electrical contacts of the at least one of the charge ports.

14. The apparatus of claim 1, comprising electrical conductors disposed within the thickness of the strap arrangement, the electrical conductors connected to and extending between the at least two charge ports and electrical contacts of the strap arrangement configured to electrically communicate with electrical contacts of the wearable electronic device.

15. A method of charging at least a pair of ear-worn electronic devices, the method comprising:
   receiving the pair of ear-worn electronic devices by two charge ports defined by through-holes provided in a strap arrangement connected to a wearable electronic device;
   generating, by a volume of resilient material of the strap arrangement surrounding each of the through-holes, a retentive force sufficient to retain the ear-worn electronic devices within the two charge ports;
   establishing electrical communication between electrical contacts of the two charge ports recessed within a thickness of the volume of resilient material, electrical contacts of the ear-worn electronic devices, and charging circuitry of the wearable electronic device; and
   charging rechargeable power sources of the ear-worn electronic devices using the charging circuitry of the wearable electronic device.

16. The method of claim 15, comprising generating tactile feedback in response to establishing mechanical engagement between the electrical contacts of the two charge ports and the electrical contacts of the ear-worn electronic devices.

17. The method of claim 15, comprising generating tactile feedback in response to mechanical engagement between a retention pin disposed in each of the two charge ports and a retention feature of the ear-worn electronic devices.

18. The method of claim 15, wherein receiving the pair of ear-worn electronic devices by the two charge ports comprises passing at least a portion of the ear-worn electronic devices entirely through the through-holes of the two charge ports.

19. The method of claim 15, comprising:
supplying power from an external source to the wearable electronic device; and
charging the rechargeable power source of the wearable electronic device and the rechargeable power sources of the ear-worn electronic devices in response to the power supplied to the wearable electronic device.

20. The method of claim 15, comprising charging the rechargeable power sources of the ear-worn electronic devices using the rechargeable power source of the wearable electronic device in response to an absence of external power supplied to the wearable electronic device.

21. The method of claim 15, comprising charging the rechargeable power sources of the ear-worn electronic devices at an accelerated charge rate above 1.0 C when a state of charge (SoC) of the rechargeable power sources is within a predetermined SoC range.

22. The method of claim 15, comprising presenting, on a display of the wearable electronic device, charging information including charge state for the rechargeable power source of the wearable electronic device and the rechargeable power sources of the ear-worn electronic devices.

23. The method of claim 15, comprising:
receiving one or more physiologic sensor pods by one or more sensor charge ports defined by through-holes provided in a volume of resilient material of the strap arrangement;
sensing one or more physiologic signals or conditions of a wearer of the strap arrangement using the one or more physiologic sensor pods; and
communicating physiologic data from the one or more physiologic sensor pods to the wearable electronic device.

24. The method of claim 15, comprising:
receiving one or more motion sensor pods by one or more sensor charge ports defined by through-holes provided in a volume of resilient material of the strap arrangement;
sensing motion of a wearer of the strap arrangement using the one or more motion sensor pods; and
communicating motion data from the one or more motion sensor pods to the wearable electronic device.

* * * * *